United States Patent
Grant et al.

[19]

[11] Patent Number: 6,095,416
[45] Date of Patent: Aug. 1, 2000

[54] METHOD AND DEVICE FOR PREVENTING UNAUTHORIZED USE OF CREDIT CARDS

[75] Inventors: Alan H. Grant, Chevy Chase, Md.; Richard J. Gambino, Stony Brook, N.Y.

[73] Assignee: Privicom, Inc., Chevy Chase, Md.

[21] Appl. No.: 09/028,855

[22] Filed: Feb. 24, 1998

[51] Int. Cl.$^7$ ................................................ G06K 7/08
[52] U.S. Cl. .................... 235/449; 235/380; 235/492; 235/493
[58] Field of Search ........................ 235/379, 380, 235/382, 449, 450, 487, 492, 493; 902/4, 5

[56] References Cited

U.S. PATENT DOCUMENTS

| | | | |
|---|---|---|---|
| 3,399,473 | 9/1968 | Jaffe | 283/83 |
| 3,624,938 | 12/1971 | Richard | 283/83 |
| 3,972,138 | 8/1976 | Armbruster et al. | 283/82 |
| 4,100,689 | 7/1978 | Broune | 283/73 |
| 4,432,567 | 2/1984 | Stockburger et al. | 283/83 |
| 4,547,276 | 10/1985 | Cadieu | 204/192.2 |
| 4,701,601 | 10/1987 | Francini et al. | 235/449 |
| 4,786,791 | 11/1988 | Hodama | 235/449 |
| 4,791,283 | 12/1988 | Burkhardt | 235/438 |
| 4,868,376 | 9/1989 | Lessin et al. | 235/492 |
| 5,016,212 | 5/1991 | Yamaguchi et al. | 711/115 |
| 5,146,068 | 9/1992 | Ugawa et al. | 235/492 X |
| 5,159,182 | 10/1992 | Eisele | 235/492 |
| 5,180,901 | 1/1993 | Hiramatsu | 235/380 |
| 5,255,941 | 10/1993 | Solomon | 283/82 |
| 5,412,192 | 5/1995 | Hoss | 235/380 |
| 5,419,788 | 5/1995 | Thoma et al. | 148/402 |
| 5,434,398 | 7/1995 | Goldberg | 235/380 |
| 5,538,291 | 7/1996 | Gustafson | 235/487 |
| 5,623,552 | 4/1997 | Lane | 235/492 X |
| 6,003,767 | 12/1999 | Hayashida | 235/380 |

*Primary Examiner*—Michael G Lee
*Assistant Examiner*—Jared J. Fureman
*Attorney, Agent, or Firm*—Jacobson, Price, Holman & Stern, PLLC

[57] ABSTRACT

An authorization card, such as a credit card, has a security feature. The authorization card generally has two operational states, a disabled state and an enable state. In the disabled state, which is the default mode of operation, access to confidential information stored on the card is denied. The card remains in the disabled state until a PIN code is entered on a keypad provided on the card. Once the card is enabled, access to the confidential information is permitted for a predetermined period of time, after which the card reverts back to the default disabled state. The security feature is implemented on a magnetic card, an electronic smart card, and passive electronic card.

20 Claims, 8 Drawing Sheets

METHOD AND DEVICE FOR PREVENTING UNAUTHORIZED USE OF CREDIT CARDS

BACKGROUND OF THE INVENTION

1. Field of the Invention

The present invention relates to cards for storing confidential information. More particularly, the present invention relates to a card, especially a credit card, bank card, or the like, which has a security feature that prevents unauthorized use of the card.

2. Description of the Related Art

Plastic cards having electronically stored data are widely used to perform a large variety of tasks, from being used as conventional credit or bank cards to use as a security key to operate a door lock. Other types of cards are gas cards, building, room and/or elevator security access cards, personnel cards, Automated Teller Machine (ATM) cards, debit cards and cash cards. For purposes of this application, however, these cards will be generically referenced as "authorization cards" or just "cards."

Authorization cards are generally either magnetic, electronic "smart cards," or passive electronic. For magnetic cards, information particular to the rightful card owner, i.e. confidential information, is typically stored in a magnetic strip located on the back side of the card. In order to complete a given transaction, the confidential information stored on the card is directly transmitted from the magnetic strip to a card reader for recognition and authorization. With regard to smart cards and passive electronic cards, the confidential information is stored electronically and is transmitted to a card reader. Though smart cards contain a power supply, passive electronic cards do not.

However, confidential information, such as credit card number, expiration date, Personal Identification Number (PIN) and name of card owner, may inadvertently become available to other parties. Fraudulent and unauthorized use of authorization cards has cost card users and issuers (such as VISA, MASTERCARD, AMERICAN EXPRESS, and DINERS CLUB), as well as entities that accept credit cards as a form of payment for goods and services, a great deal of money.

SUMMARY OF THE INVENTION

Accordingly, it is a primary object of the present invention to provide an authorization card that prohibits unauthorized use and prevents unauthorized users from obtaining confidential information.

It is another object of the invention to provide a security feature for a card having confidential information stored on either a magnetic strip or a semiconductor chip.

It is a further object of the invention to provide an authorization card that requires authorization in order to enable access to confidential information.

It is yet another object of the invention to provide a secured authorization card which physically appears to be valid and usable, though actually is in an unusable state.

It is yet another object of the invention to provide a secured authorization card which, in its default condition, disables access to confidential information and, in an enable condition, temporarily permits access to the confidential information.

It is yet another object of the invention to provide a card having an authorization procedure that does not change the physical appearance of the card.

Accordingly, the authorization card of the present invention has a security feature. The authorization card generally has two operational states, a disabled state and an enabled state. In the disabled state, which is the default mode of operation, access to the confidential information stored on the card is denied. The card remains in the disabled state until a PIN code is entered on a keypad provided on the card. Once the card is enabled, access to the confidential information is permitted for a predetermined period of time, after which the card automatically reverts back to the default disabled state.

The security feature has three main embodiments, one for each of a magnetic card, smart card, and passive electronic card. In the first embodiment, corresponding to a magnetic card, permanent magnets are placed on either side of the magnetic strip which stores the confidential information. In the disabled state, a magnetic disable field is induced across the magnetic strip in order to prevent confidential information from being read from the magnetic strip.

The permanent magnets are connected by a yoke having gaps filled with a polymer. The gaps are located directly beneath keys of a keypad. The user enters a PIN code by depressing the keys. When the correct PIN code is entered, the polymer located in the gaps increases in size, thereby increasing the size of the respective gaps and decreasing the permeability of the yoke. As the permeability of the yoke decreases, the magnetic disable field across the magnetic strip is reduced, thereby permitting a card reader to access the confidential information stored on the magnetic strip. After the keys are released, the polymer reverts to its original size, and the card reverts back to the default or disabled state.

Alternatively, the polymer may be replaced by a secondary permanent magnet positioned parallel to, and directly beneath, the yoke. Respective sections are cut from the secondary magnet and yoke, and to align with keys of a key pad. The secondary magnet is in a demagnetized state. However, the sections in the secondary magnet corresponding to correct PIN keys are magnetized to resist magnetic flux in the yoke. Accordingly, when the correct PIN code is entered, the reverse-biased sections of the secondary magnet move into openings in the yoke to reduce the magnetic flux of the yoke, and thereby diminish the disable field. The key slowly returns to its initial position, and the card returns to the default disable state.

In a second embodiment, the security feature is implemented in a smart card. Here, the confidential information is stored in a solid state circuit. In the disabled state of operation, a transistor prevents the confidential information from being accessed. Upon entry of the correct PIN code, however, a capacitor is charged to enable a gate of the transistor, thereby permitting the confidential information to be accessed. The charge on the capacitor slowly bleeds off until the transistor gate is closed, and the card returns to the default disabled state.

In a third embodiment, the security feature is implemented in a passive electronic card, such as a building security access card. Here, a resonant circuit is used to transmit confidential information when certain resonance frequencies are realized. The keys of the keypad comprise variable capacitors, which form a branch of the resonant circuit. As the keys are depressed, the capacitance of the variable capacitors is altered, thereby selectively controlling the resonant frequency of the circuit. When the correct PIN code is entered, the resonance circuit is tuned. As the keys return to their original shape, the resonant circuit becomes detuned, and the card returns to the default disabled state of operation.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The present invention is an authorization card having a security feature to prevent unauthorized use of the card. The card generally has two states of operation, a default state corresponding to a disable state, and an enable state. When the card is in the disable state, access to confidential information stored on the card is denied. The card remains in the disable state until an authorized user places the card in an enable state. Thus, the card normally cannot be used.

In order to access the confidential information, and thus enable a user to use the card, a PIN code must be entered. The PIN code temporarily places the card in the enable state. The PIN code is set by the user at the time the card is initially used and need only be known to the user.

Once the correct PIN code is entered, the card is activated for a predetermined limited time. After the predetermined time, the card returns to the disable state so that it cannot be used for a fraudulent transaction. The means for putting the card in the enable state are preferably contained within the card, such as being entered into a small key pad built into the card. However, the means for placing the card in the enable state may be located at a portable auxiliary device, or through other suitable means.

The security feature is preferably implemented in at least the following embodiments: magnetic cards, smart cards, and passive electronic cards.

Magnetic Card Embodiment

Figure 1:
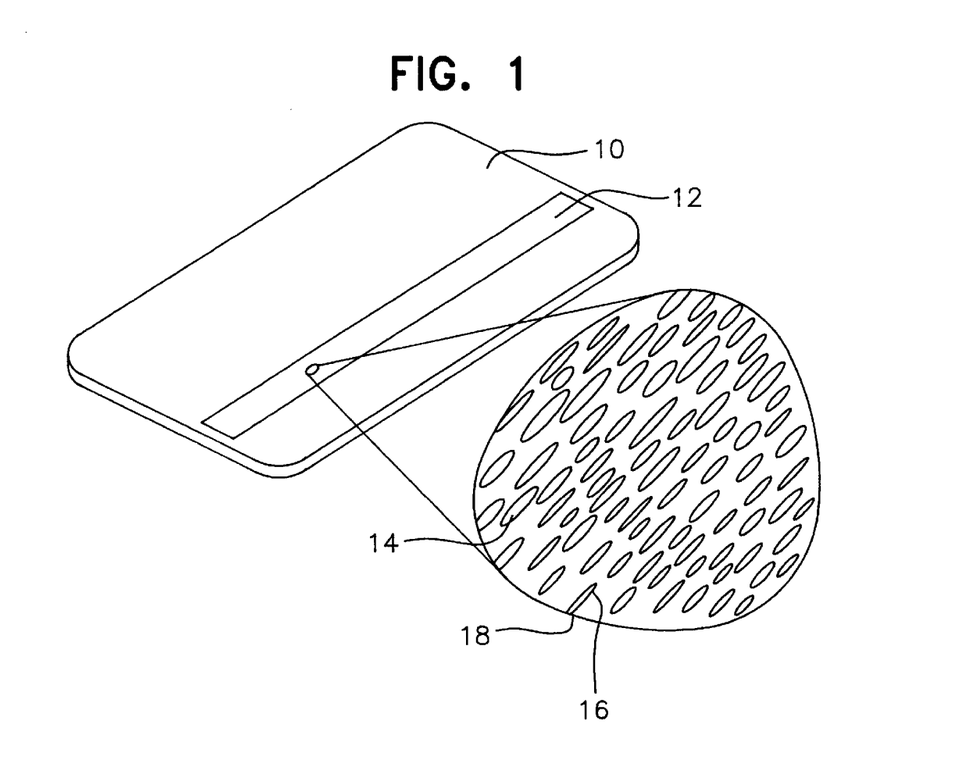
FIG. 1 is a perspective view of the back side of an authorization card, with the magnetic strip magnified.

Now turning to the drawings, FIG. 1 shows an authorization card 10 having a magnetic strip 12, as preferably implemented for use as a credit card. The magnetic strip 12, when activated, can be read on a conventional card reader (not shown). The magnetic strip 12 conforms to International Standards for credit or bank cards, such as ISO 7811/5, 7811/4 and 7811/2.

As shown in the magnified portion of FIG. 1, the strip 12 has acicular single domain magnetic particles 14, which are aligned with the easy magnetic axis along the long axis of the particle 14. The magnetic particles 14 are embedded in an organic binder and substantially oriented with their long axis parallel to the long axis of the magnetic strip 12. In the embodiment of FIG. 1, the north pole 16 of the particles 14 are toward the right side of the card 10 and the south pole 18 of the particles 14 are toward the left side of the card 10.

Figure 2:
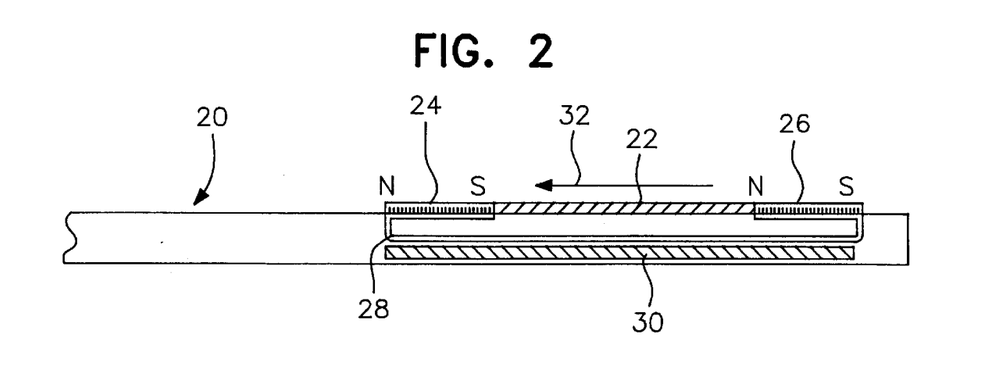
FIG. 2 is a cross-sectional side view of an authorization card in accordance with a first embodiment of the present invention.

Now turning to FIG. 2, the security feature is implemented in an authorization card 20 having a magnetic strip 22 that contains confidential information. The card 20 essentially comprises magnetic strip 22, primary permanent magnets 24, 26, yoke 28 of permeable magnetic material, and secondary permanent magnet 30. The primary magnets 24, 26 are located on either side of magnetic strip 22. The magnets 24, 26 are recessed about halfway into the card 20 and a lamination is applied to the card. This arrangement makes it difficult for an unauthorized user to cut away the magnets 24, 26 without destroying the strip 22.

The poles of primary magnets 24, 26 are aligned with each other and connected by a yoke 28 made of permeable magnetic material. Magnetic flux is transmitted by yoke 28 so that the primary magnets 24, 26 induce a magnetic field or hard axis disable field 32 to the strip 22 in the plane of the strip 22 and perpendicular to the long axis of the strip 22. The magnetic field 32 is thus applied along the hard magnetic axis of the single domain particles 14 and is preferably of sufficient magnitude to rotate the magnetization vector from 30 to 45 degrees away from the easy axis.

Accordingly, the primary permanent magnets 24, 26 cooperate to reduce the strength of the z-component of the magnetic flux at a transition below the threshold signal amplitude for detection. The z-component is the component read by a card reader to receive the confidential information. Thus, the primary magnets 24, 26 maintain the magnetic strip 22 in a deactivated or disabled state as a default state of the card 20. As long as the disable field 32 is present, confidential information located on strip 22 cannot be accessed.

The disable field 32 can be applied over the entire length of the magnetic strip 22. Preferably, however, the disable field 32 is only applied in selected key areas of the magnetic strip 22. For instance, when confidential information is read from strip 22, an initial string of zeros are first read to set a clock for reading the confidential information. Thus, the disable field 32 may be applied only to that portion of the strip 22 containing the initial string of zeros, thereby preventing proper readout of the confidential information. This portion of the magnetic strip 22 is shown, for instance, by the dashed portion 23 of FIG. 3.

Figure 3:
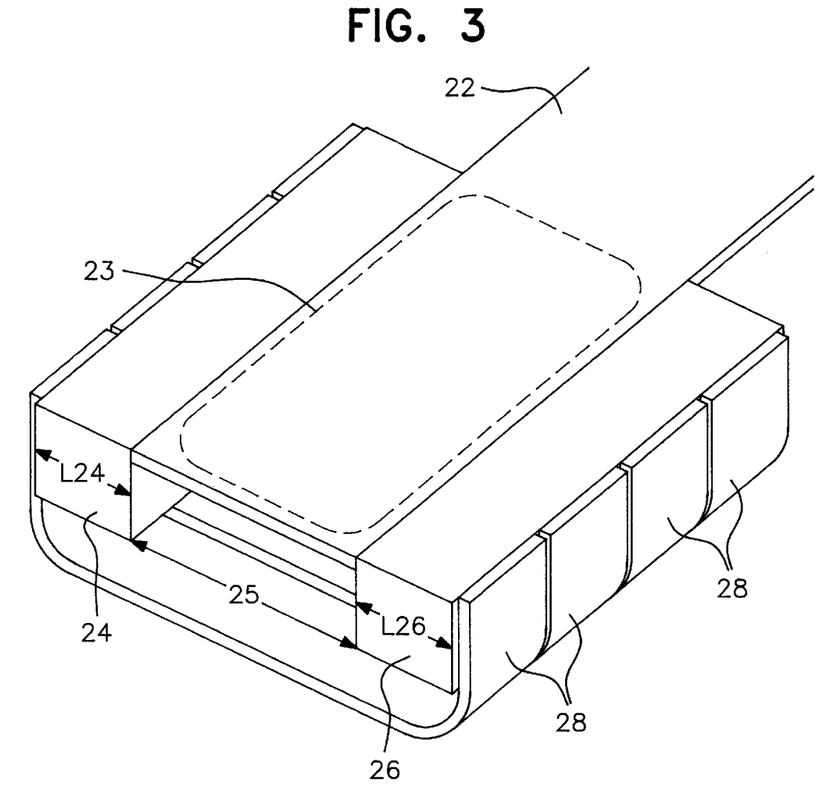
FIG. 3 is a perspective view of the permanent magnets and yokes of the authorization card of FIG. 2.

As shown in FIGS. 2 and 3, the yoke 28 preferably connects to the outside edges of the permanent magnets 24, 26. However, the yoke 28 may alternatively connect to the inside edge of magnets 24, 26 to minimize thickness of the card 20. The yoke 28 is preferably a ribbon of an amorphous magnetic alloy of nickel and iron with small amounts of P, B and Si. The alloy has a negative magnetostriction coefficient so that when it is in tension the easy magnetic axis is perpendicular to the direction of elongation.

As further shown in FIG. 3, the yoke 28 is preferably divided into four or more parallel strips or bands, connecting the two primary permanent magnets 24, 26 and completing the magnetic circuit. As long as the yoke magnetic circuit is functional, the strength of the hard axis magnetic field is sufficient to disable transmission of confidential information from the magnetic strip 22, such as the clock bit portion 23. In addition, although permanent magnets 24, 26 are shown in FIG. 3 as having a continuous elongated rectangular shape, numerous smaller magnets may be used. Accordingly, a magnet may be provided at the ends of each yoke band 28, so that each primary magnet 24 and 26 each comprise four separate magnets, preferably having the same width of the yoke band 28.

Figure 4A:
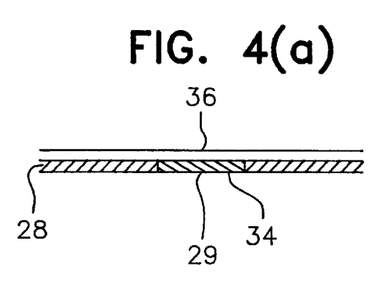
FIGS. 4(a), (b) and (c) show a gap used to interrupt the yoke shown in FIG. 2.

In order to permit access to the confidential information stored on strip 22, the magnetic field 32 is effectively turned ON and OFF. Referring to FIG. 4(a), gaps 34 are first introduced in each of the parallel strips of the yoke 28. The yoke 28 is coated with a polymer 36, which is bonded to the yoke preferably by heat bonding. The polymer 36 material is selected to be more deformable than the yoke 28, and is preferably a polypropylene.

When gaps 34 of sufficient size are introduced in the yoke 28, the permeability of the yoke 28 is reduced, which in turn diminishes the magnetic disable field 32. As the hard axis field 32 decreases, the magnetization vector of the single domain particles 14 turn to the long axis of the strip 22 and the signal strength increases enough to be above the threshold read signal. Numerous yoke bands 28 are used, as opposed to a single yoke, so that the gaps 34 will better interrupt the magnetic flux being transmitted by each yoke 28, which, in turn, provides a more effective interruption of the disable field 32. Preferably, four yoke bands 28 are provided, each having a width of about 8 mm and spaced 2 mm apart.

The PIN code is encoded by cutting the yoke 28 in selected areas to form yoke segments 29 aligned with number or letter positions under a key pad. The cuts do not reduce the permeability of the yoke 28 significantly because the cuts are small, approximately 0.1 mm. After the cuts are made, the polymer 36 coating over the permeable yoke is reflowed by heat and pressure to conceal the regions cut. The polymer, which is preferably polyethylene or polypropylene, is about 1 mm thick.

Figure 4B:
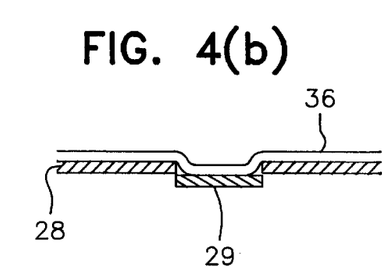

When the card 20 is used, pressure is applied to the key pad at the numbers or letters corresponding to the PIN code, as shown in FIG. 4(b). The pressure does several things. First, it deforms the polymer 36 so that the gap 34 in the permeable yoke 28 is increased. The increase in gap width is due to the width of the hole getting larger. The permeability of the yoke is decreased because the yoke segment 29 under the key pad 34 is displaced from the plane of the yoke 28 so that in order for the magnetic flux lines to pass through it, the flux lines must make an angle to the easy magnetic axis of the yoke material.

The easy magnetic axis of the yoke 28 is in the plane of the yoke due to the shape anisotropy and stress anisotropy of the yoke. Due to the displaced yoke segment 29, the increased gap and the decreased permeability of the yoke segment 29 decreases the permeability of the yoke 28, which in turn decreases the in-plane magnetic field 32 on the magnetic information storage strip 22. Hence, when a sufficient number of keys are depressed, the displaced yoke segments 29 will reduce the magnetic field 32 to the point that confidential information can be accessed from the card.

Second, the yoke segment 29 material under the code letter is deformed, putting it into tension. By using an alloy with a large negative magnetostriction coefficient, easy axis of magnetization of the local area of yoke 28 is rotated perpendicular to the long axis of the permeable yoke 28. This change in magnetic anisotropy further reduces the permeability of the yoke 28 and increases the in-plane field 32 on the information storage strip 22.

Third, when the pressure is removed, the polymer 36 begins to relax back to its original shape. The polymer or polymer blend, which is preferably a blend of polystyrene and PolyMethyl MethAcrylate (PMMA), is selected so that the relaxation time gives the desired activation time of the card 20. The user may also reset the card to its inactive state by keying in the PIN code on the back side of the card, thus pushing the permeable yoke 28 sections 34 back into their original position shown in FIG. 4(a).

Figure 4C:
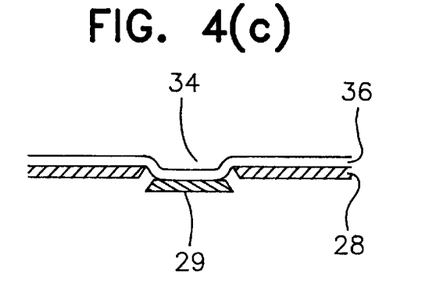

As shown in FIG. 4(c), the yoke segment 29, as well as yoke 28, may have ends that cut at an angle. This provides a greater distance between the yoke segment 29 and the remaining yoke 28 when the segment 29 is depressed. Thus, less flux will be transmitted across segment 29 and along yoke 28, thus providing a more effective flux barrier and interruption of the disable field 32.

At this point, however, the protective feature of the magnetic embodiment using the permeable yoke 28 can be defeated by pushing every key on the key pad. That is, by pressing every key, all of the breaks in the permeable yoke 28 will be opened and the card 20 will function for a time. Nonetheless, some protection is still provided since the authorized user will go directly to the correct keys so the card will be active for a longer time. In addition, an unauthorized user will not be aware that the card may be activated by pressing all keys.

Figure 5A:
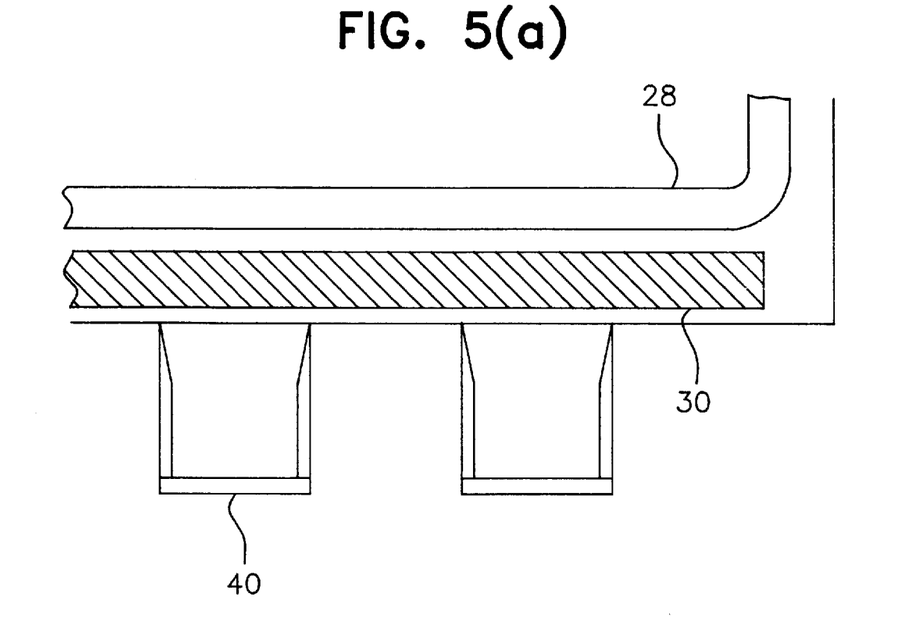
FIGS. 5(a) and 5(b) show construction of the authorization card of shown in FIG. 3.
Figure 5B:
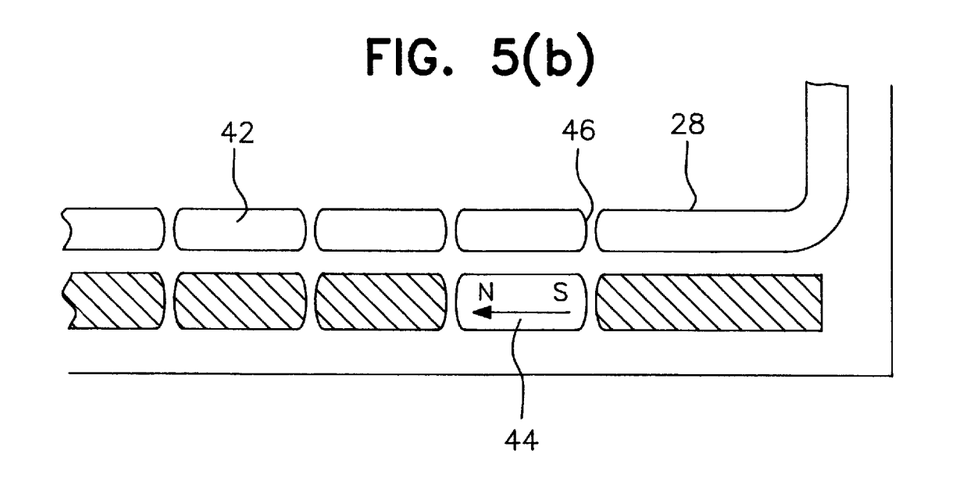

However, this difficulty can be overcome by adding an additional or secondary permanent magnet 30, as shown in FIGS. 5(a) and (b). In this alternative embodiment, the card is protected against the "push every key" form of fraudulent operation. The segments of the secondary magnet 30 have a reverse bias to that of primary magnets 24, 26 in order to more effectively reduce disable field 32. Thus, the secondary magnet is used to proactively activate and deactivate the disable field 32.

In the present embodiment, the use of secondary magnet 30 may replace polymer coating 36. However, a polymer coating 36 may also be used in combination with the secondary magnet 30, and the coating may be applied either to the yoke 28 and/or the secondary magnet 30, as suitable.

Initially, however, the secondary magnet 30 is in a demagnetized state. The secondary magnet 30 material is provided in the form of a thin sheet parallel to, and in close proximity to, the permeable yoke 28. The secondary permanent magnets 30 preferably are commercially available sheets containing $BaFe_{12}O_{19}$ and $SrFe_{12}O_{19}$ dispersed in a polymer binder and are sometimes referred to as flexible magnets.

The process used to encode the card 20 will now be discussed with reference to FIGS. 5(a) and 5(b). At the selected key locations, the demagnetized secondary magnet layer 30 and the yoke 28 are cut by cutting blades 40 (FIG. 5(a)). Several randomly selected locations are also cut in identical fashion. Thus, aligned cut sections 42, 44 of yoke 28 and secondary magnet 30 are formed, respectively. The cut sections 42, 44 are approximately 8 mm wide and 8 mm in length. so as to be of sufficient size to interrupt the disable field 32.

In the next step, shown in FIG. 5(b), the secondary magnet sections 44 at the key pad locations are magnetized. A small "U" shaped electromagnet (not shown) is positioned so that the material 44 to be magnetized is between the pole pieces. A current is then passed through the coil of the electromagnet so as to produce a magnetic field between the pole pieces which exceeds the coercive field of the secondary permanent magnet 44 material. The coercivity of commercial flexible magnets is about 2200 Oe.

The magnetizing field is applied so that the secondary permanent magnet 28 materials at the encoded key pad locations results in a magnetized key 44. The key 44 is magnetized in opposition to the primary permanent magnets 24, 26. Thus, when a correct key is depressed, the secondary magnetized permanent magnet key 44 at the encoded key pad location displaces the respective yoke section 42. The magnetized section 44 then enters the opening 46 in the magnetic yoke 28.

The flux from the magnetized material at the depressed PIN number location 44 is carried by the yoke 28 to the magnetic strip 22 where it cancels the bias field from the primary magnets 24, 26. Thus, when the encoded key pad locations are pushed, the hard axis disable field 32 at the magnetic strip 22 is reduced to the point that the magnetic strip 22 can be read on a conventional magnetic card reader.

The card reader is preferably set to recognize signals from the magnetic strip 22 that are above a threshold level of approximately 90 percent of its normal, unperturbed level. This threshold level is selected to only permit recognition of signals when only the correct PIN code is entered. If an unauthorized user attempts to defeat the protective feature of the card 20, random false keys 44 will also be pushed.

Accordingly, the card is configured so that, if the user depressed only the false keys, the disable field 32 will only be reduced by about 20–25 percent, which raises the strip 22 signal to about 85 percent. Likewise, if all the keys, are depressed, the disable field 32 is reduced by about 30–35 percent, which raises the magnetic strip signal to about 89 percent. However, depressing only the PIN code will reduce the disable field 32 by a factor of about two (50%). This reduction in the disable field 32, in turn, is sufficient to restore the magnetic strip 22 to about 94 percent of its full, unperturbed signal strength, which is sufficient to place the card in the enabled state.

When a false key 44 is pressed, low permeability demagnetized permanent magnet material 44 is displaced into openings 46 in the yoke 28 as well as magnetized material at the PIN number locations 44. The false keys 46 introduce breaks in the yoke 28 that reduce the effectiveness on the reverse bias effect produced by the magnetized material 44 at the PIN number locations.

Although the break also reduces the magnetic disable field 32, there is a greater reduction of the disable field by the reverse bias alone. Accordingly, when both a PIN key and a false key are pressed, on the same yoke band 28, the threshold level will not be exceeded. Thus, when only the correct keys are depressed, the card is activated. But, if both correct keys and false keys are depressed, the card will not be activated. Since the keys are located on any of the four yoke bands, if only one false key is pressed, the portion of the code blocked by the respective disable field 32 at the yoke band is sufficient to disable the card.

Typical oxide magnetic media used in credit cards have saturation magnetization of about 3,600 to 6,600 Gauss (G). In the preferred embodiment, the primary magnets 24, 26 and yoke 28 are selected so that the hard axis disable field 32 is approximately two-thirds of the hard axis saturation field, or about 2,400 to 4,400 Oersted (Oe). When the applied disable field 32 is two-thirds of the hard axis saturation field, the magnetization makes an angle θ of about 41.8 degrees from the easy axis (since sin θ=⅔). The projection of the magnetization along the easy axis is cos θ, or 0.745.

Therefore, the magnetization component along the long axis of the magnetic strip 22 is reduced about 25 percent from its normal value. When the magnetic strip is read, the signal is reduced by a proportional amount. By setting the acceptable signal level of the card reader to be 90 percent of the standard undisturbed level of strip 22, inactive or unauthorized cards can be discriminated against. In the original embodiment not having the secondary magnet 30, however, the threshold level may be relaxed to about 80 percent. A 5 percent difference between pass and fail signals is sufficient to allow for some variation in reading signals.

Preferably, chromium dioxide, $CrO_2$, is used for the magnetic strip 22, which has a saturation magnetization of 6,472 G. Hence, a magnetic disable field 32 of 4,315 Oe is used in the plane of and perpendicular to the long axis of the magnetic strip 22 to rotate about two-thirds of the magnetization perpendicular to the magnetic strip 22.

The primary magnets 24, 26 each have an energy product of $BH_{max}$ of about 4 mega Gauss Oersteds (MGOe) to give a field strength of about 1500 Gauss in a gap in the yoke over the magnetic strip 22. The magnetized PIN key portions 44 of the secondary permanent magnet 30 are each about $BH_{max}$ 4 MGOe. This enables the z-component of the magnetic field generated by strip 22 to be rotated about 30 degrees. This rotation is effective to prevent a card reader from recognizing confidential information stored on the strip 22. Less than about 25 degrees, however, does not effectively block the confidential information. More than about 50 degree rotation, on the other hand, is excessive and may require reverse compensation in order to return the card to the disable state.

The card 20 is configured to be within acceptable thickness standards. The size and thickness of the primary permanent magnets 24, 26 must be at least as thick as the medium of the magnetic strip 22. Thus, the primary magnets 24, 26 and strip 22, as well as yoke 28, are each about 30 mils thick. In addition, there is a space of about 20–30 mils between the yoke 28 and the magnetic strip 22 to prevent inadvertent interference between the yoke 28 and the strip 22. The card 20 is about 0.75 mm thick, with the permanent magnets protruding from the surface of the card about 0.10 mm. The magnetic strip 22 is about 8 mm wide, and the primary magnets L24, L26 are each about 8 mm in length, so that the yoke 28 is about 26 mm long and 5–8 mm wide.

Further to the preferred embodiment, each yoke band 28 of FIG. 3 will have 1–2 correct PIN keys. The PIN code itself is preferably equal to the number of yoke bands 28, or about 4 digits. The shorter the PIN code, the less permutations available to decode the PIN code. However, as the PIN code increases in size, the greater the number of gaps per yoke band 28, and the greater the chance that less than the entire number of correct PIN codes may defeat the system. Accordingly, each yoke band 28 will have at least 1 reverse-biased section 44 that interrupts the flux carried by yoke 28. The gaps 34 preferably extend the entire width and thickness of the yoke 28.

The width 25 of the gap between the primary permanent magnets 24, 26 is approximately equal to the width of the magnetic strip 22, or about 8 mm. In this manner, all particles 14 located in the strip 22 are affected by the permanent magnets 24, 26. If the gap between magnets 24, 26 has a smaller width than that of the strip 22, not all of the strip 22 will be magnetized by the disable field 32. In addition, the width of the gap between permanent magnets 24, 26 is no greater than that of the strip 22 in order to keep the weight and thickness of the card to a minimum.

However, it is recognized that smaller or larger magnets 24, 26 may become available that are equally suitable. For flexible magnets and ceramic magnets, the length of the magnet L24, L26 may be twice the width of the strip 22. When high energy product magnets, like an intermetallic compound $Nd_2Fe_{14}B$, are used, it is sufficient if the combined length of the magnets L24 and L26 is equal to the width of the strip 22.

Both surfaces of the card are preferably covered with a thin opaque polymer membrane which does not plastically deform when the PIN code is entered. The membrane conceals the location of the deformed regions. Removal of the membrane will also remove the magnetic information storage strip 32 and thus permanently invalidate the card.

Spiral Yoke Configuration

Figure 6:
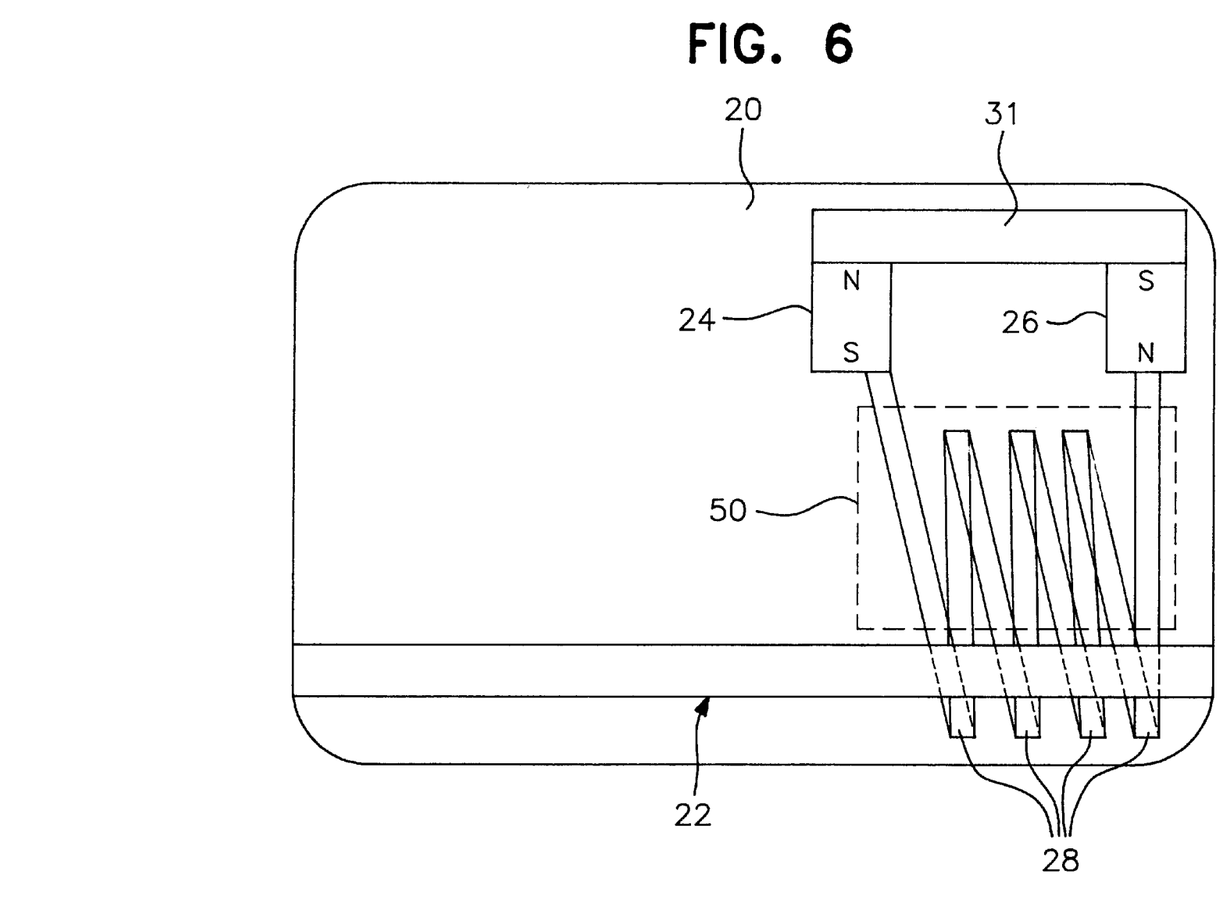
FIG. 6 is a view of the back side of an authorization card in accordance with an alternative first embodiment.

Turning to FIG. 6, a spiral yoke 28 configuration is used in order to position a greater amount of permeable material under the key pad 50. The key pad 50 is preferably located on the front of the card 20, and the strip 22 is typically located on the back side of the card 20. However, the key pad 50 may be located on the same side as the magnetic strip 22.

This configuration also locates the primary permanent magnets 24, 26 far from the magnetic strip 22. In this manner, the primary magnets 24, 26 only control the magnetic state of the magnetic strip 22 through the passage of magnetic flux through the yoke 28. The secondary magnet may be bonded to the yoke 28, or by vacuum depositing magnetic particles, such as by sputtering or ion-beam deposition.

The primary permanent magnets 24, 26 are connected by a flux closure yoke 31, which completes the magnetic circuit. A yoke 28 of permeable magnetic material extends from one of the permanent magnets 24 to the magnetic strip 22. The permeable material 28 continues to the other side of the magnetic strip 22, is bent to make a hairpin turn so that it passes under the magnetic strip 22 and back toward the permanent magnets 24, 26. The permeable material 28 is bent again to make another hairpin turn near the edge of the key pad 50 closest to the permanent magnets 24, 26 so that the permeable material 28 returns to the magnetic strip 22.

The next section of the continuous permeable material 28 begins on the opposite side of the magnetic strip 22 and passes under the magnetic strip 22 and back to the magnetic strip 22 with two hairpin turns as before. The last section extends back to the other permanent magnet 26 to complete the magnetic circuit. Generally, the yoke 28 is bent downward at the end closes to primary magnets 24, 26, and bent upward at the opposite end.

The permeable material 28 should have a saturation magnetostriction of less than $10^{-6}$ so the stress caused by sharp bends does not cause high coercivity and low permeability regions in the yoke 28. Amorphous magnetic alloy ribbons have high permeability in general. However, compositions having high iron content usually have high magnetostriction and therefore are not suitable for this embodiment.

Electronic Card Embodiment

Figure 7A:
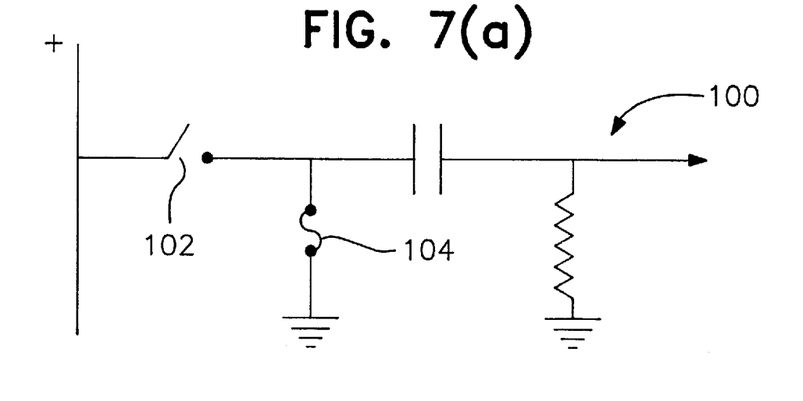
FIGS. 7(a), (b) and (c) are circuit diagrams for an authorization card in accordance with a second embodiment of the invention.
Figure 7B:
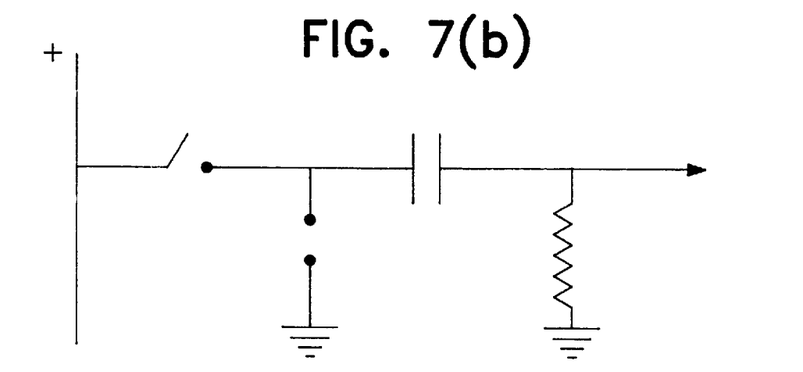
Figure 7C:
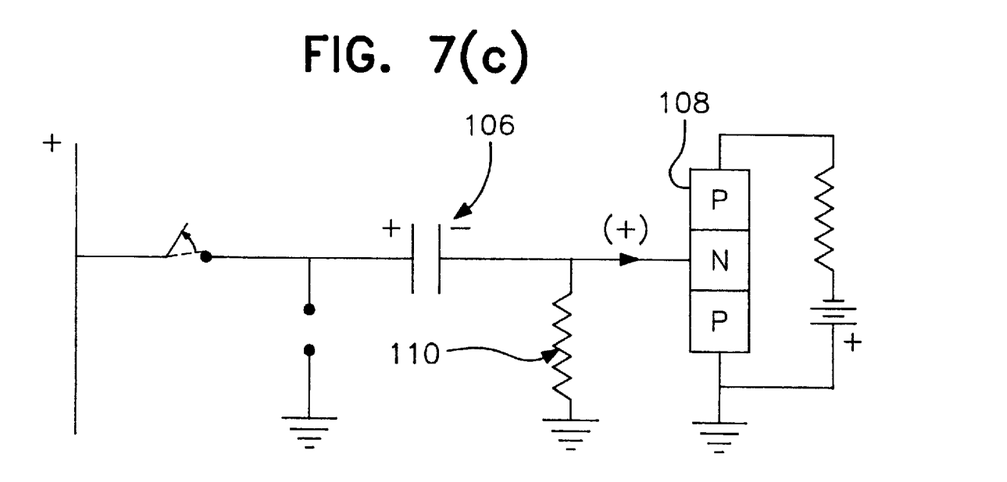

Electronic "smart cards" typically use an active, powered solid state circuit 100 to store confidential information. As shown in FIGS. 7(a)–(c), the electric card uses a key pad with simple contact switches 102. A switch 102 is provided for each key of a key pad. The card is encoded by enabling circuits associated with the PIN code keys by burning out fusible connections 104 to ground.

The encoded keys, when pressed, close (that is, complete) a circuit to a capacitor 106 which is charged to a potential sufficient to open the gate of a bipolar or field effect transistor 108, which is connected to each of the capacitors 106 (though only shown for the bottom capacitor 106). The emitter of the transistor 108 is connected to a power supply and ground and the collector of the transistor 108 is connected to a load resistor. When the gate of the transistor 108 is open, the data stored in the solid state circuit can be accessed by conventional electronic means, for example, a computer connected to the electronic card by means of electrical contacts on the card.

FIG. 7(a) shows a decoy circuit corresponding to a false PIN key. The fusible connection 104 is not burned out. Thus, when contact switch 102 is operated, it will be connected to ground via fusible connection 104. Operation of switch 102 will, therefore, not charge capacitor 106 and the gate to the transistor will not open.

FIG. 7(b) shows an enabled circuit in the default OFF or disable state. Here, the fusible connection 104 is burned out, indicating that the associated switch 102 corresponds to a correct PIN key. Since switch 102 is open, the capacitor 106 does not charge, and the gate of the transistor 108 remains closed.

When switch 102 is closed, as shown in FIG. 7(c), the enabled circuit is in the ON or enabled state. With the fusible connection 104 burned out, power is transferred from the power supply to charge the capacitor 106. Once the capacitor 106 is charged, the gate of the transistor 108 is open, and the confidential information may be accessed.

The capacitor 106 is also connected to ground through a resistor 110. Since switch 102 is only momentarily operated, the switch 102 will return to the open position. The charge on the capacitor 106 bleeds off to ground in accordance with the formula: $Q=Q_0 e^{-t/\tau}$, where Q is the charge at time t and $Q_0$ is the initial charge. Here, $\tau$ (tau) is a time constant (in seconds) set by the product of the resistance R (in ohms) of the resistor 110 and the capacitance C (in Farads) of the capacitor 106.

When sufficient charge has bleed off of the capacitor 106, the voltage on the gate of the transistor 108 drops below a critical value, and the gate closes, thereby deactivating the card. Thus, the card will automatically become deactivated. The user may activate the card at any time by entering the PIN code.

Passive Electronic Device Embodiment

Passive electronic devices are electronic data storage devices which do not contain a power supply. Instead, the passive devices respond to an electromagnetic field in a manner which provides a transfer of information to a nearby receiving station. This invention provides a temporary activation security device for passive electronic devices using a resonant circuit 200 such that the device only responds to frequencies in a narrow range of the electromagnetic spectrum.

Figure 8:
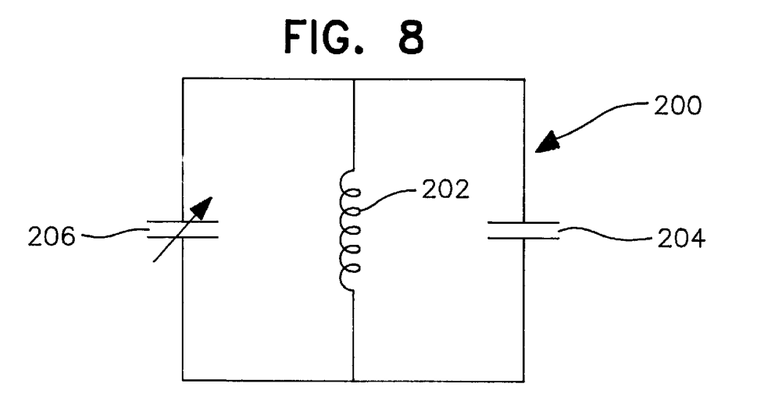
FIG. 8 is a circuit diagram for an authorization card in accordance with a third embodiment of the invention.
Figure 9A:
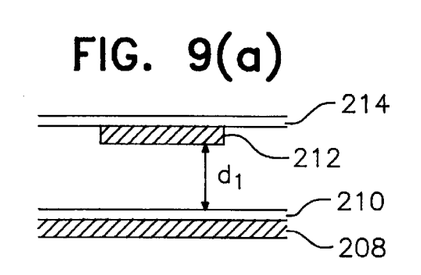
FIGS. 9(a) and 9(b) show operation of the variable capacitor used in the circuit diagram of FIG. 7.

A resonant circuit 200 is shown, for instance, in FIG. 8. Preferably, the circuit 200 is comprised of an inductor 202, a fixed capacitor 204, and a variable capacitor 206. The variable capacitor 206, shown in cross-section in FIG. 9(a), is comprised of a lower conductor plate 208 and an upper conductor plate 212. A variable capacitor 206, and a resonant circuit 200, is provided for each PIN number. The card reader (or base station) will only read information when the plurality of resonant frequencies are recognized.

Accordingly, a separate circuit 200 is provided for each key in the PIN code. When the card reader has recognized each key, the information will be accessed.

The lower conductor plate 208 is covered by a thin layer of dielectric 210. The dielectric layer 210 has a high dielectric constant, and imparts a drastic change in the capacitance as the distance d changes between the upper conductor plate 212 and the lower conductor plate 208. An upper conductor plate 212 is attached to and supported by a plastically deformable membrane 214. The membrane 214 is preferably a polymer that is heat bonded or adhered to the upper conductor plate 212.

Figure 9B:
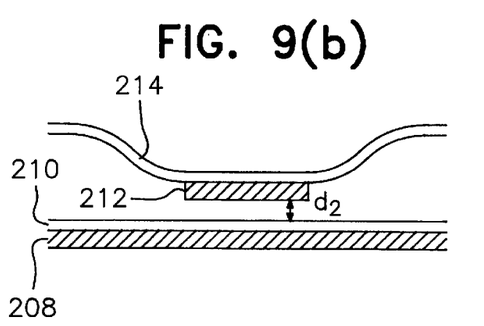

In the default or disable state, the upper plate 212 is separated from the dielectric layer 210 on the lower plate 208 by a distance d1. To activate the resonant circuit 200, the area of the plastically deformable membrane 214 over the upper plate 212 is depressed to deform the membrane 214 as shown in FIG. 9(b). The distance between the upper conductor plate 212 and the dielectric layer 210 is decreased to d2.

As the distance between the upper conductor plate 212 and the dielectric layer 210 decreases, the capacitance of the variable capacitor 206 increases. The capacitance of a parallel plate capacitor 206 is inversely proportional to the distance separating the plates 212, 208. The circuit 200 becomes resonant to the preselected frequency when the spacing is at d2.

With time, membrane 214 relaxes back toward its original shape, increasing the distance between the plates 208, 214 to d1 and decreasing the capacitance of the capacitor 206. The circuit 200 is thus detuned so that it is no longer resonant and the circuit is restored to the disabled state.

In this device, as in the other embodiments of the invention, the device can be activated temporarily at will, but returns to a disable state within a predetermined time period. The device is particularly useful for use in passive systems, such as speedpass payment devices used to purchase gasoline, Electronic Toll Collection Systems (ETC) for electronic payment of highway tolls, and elevator control keys.

Figure 13:
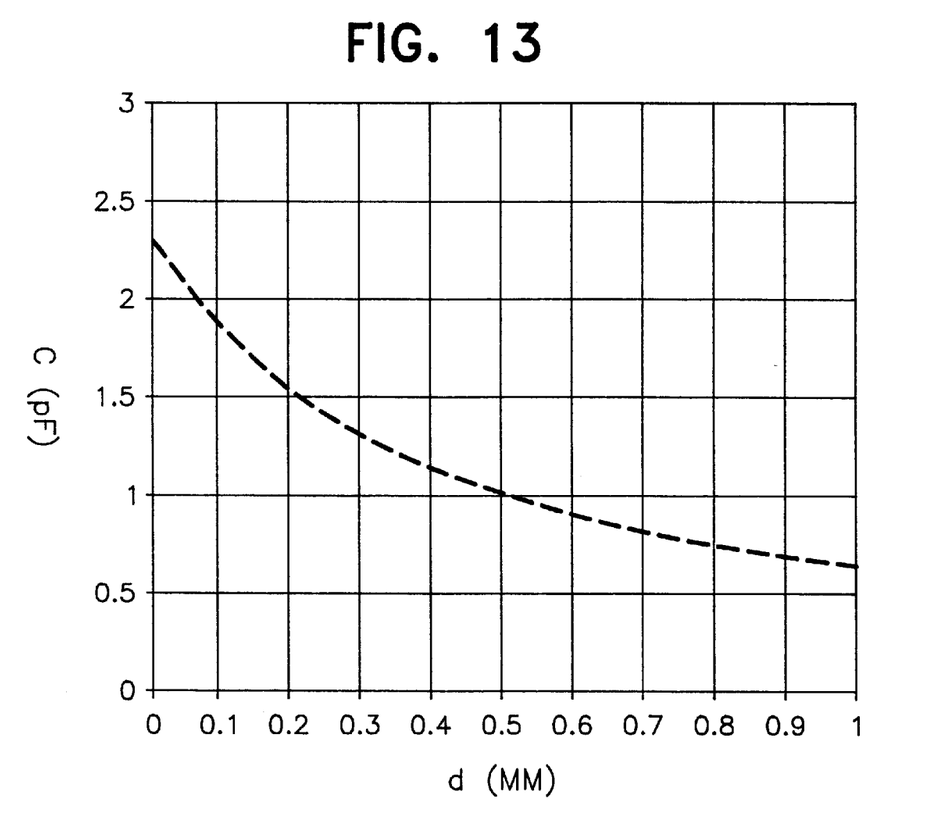
FIG. 13 is a chart of capacitance related to distance for the variable capacitor of FIGS. 9(a) and 9(b).

FIG. 13 is a chart showing the relationship of capacitance to distance, in accordance with the equation $C = \epsilon_0 A (k_2/(k_2 d + th))$, where $\epsilon_0$ is a constant, $8.9 \times 10^{-12}$ $c^2/nt\text{-}m^2$; A is the area of the capacitor plates 208, 212; $k_2$ is the dielectric constant of the dielectric layer 210, preferably 2.6; this the thickness of the dielectric layer 21, preferably $10^{-3}$ m; and, d is the distance from the upper plate 212 to the dielectric layer 210. The range for d is $10^{-2}$ m to 0 m.

As is clear from FIG. 13, the capacitance has a fast recovery, followed by a long tail. This will permit the circuit to resonate for 90 to 120 seconds. Passive cards are not physically passed through a reader, but instead transmit the confidential information to the reader. Thus, the reader may be configured to constantly search for the proper resonant frequencies to occur within a certain period of time, irrespective of the time the individual resonant circuits 200 for each key of the PIN code is enabled. For instance, a particular circuit 200 may resonate for a short time, such as 30 seconds, so long as a signal is received from each circuit 200 within 120 seconds.

Further to the preferred embodiment, the inductor 202 has a value of 0.628 mH and the fixed capacitor 204 is 0.97 pF. The variable capacitor has a capacitance range from 0.643 pF at d1 to 2.31 pF at d2. The membrane 214 is preferably a polymer, such as polystyrene with a dielectric constant of 2.6, and is about 1 mm thick.

Multi-functional Magnetic Cards

Figure 10:
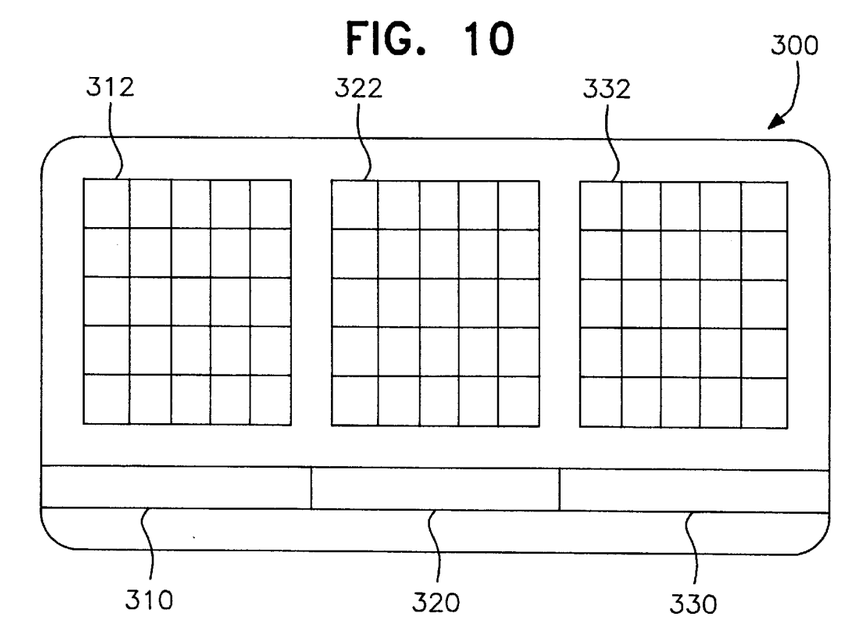
FIG. 10 is a top view of a multi-functional authorization card.

As shown in FIG. 10, a multi-functional magnetic card 300 is provided. That is, the card 300 is provided with several data bands on one or more magnetic strips 302. In the present embodiment, an authorization card 300 comprises one magnetic strip 302, which is divided along its length into zones 310, 320 and 330. Each zone 310, 320, 330 is used to store data for one function, such as corresponding to a single credit card company.

A key pad 312, 322, 332 is located adjacent each zone 310, 320, 330, respectively. Each zone 310, 320, 330 of the magnetic strip 302 can thus be activated at will by entering a PIN code into the adjacent key pad 312, 322, 332. The card is read using a conventional magnetic card reader. The bit spacing along the magnetic strip 302 is compressed, in accordance with conventional compression techniques, to be smaller than the standard 25 micrometer spacing in order to provide space for three times as much data as in a conventional card. A conventional magnetic card reader can read data stored with bit spacing at least 10 times smaller than the standard with high accuracy.

By using a PIN code to activate one zone at a time, a single credit card company, such as "VISA," "MASTERCARD," or "AMERICAN EXPRESS" can be selected for a particular transaction. The other zones 310, 320, 330 are not activated, so that they do not interfere with the card reader recognition of the activated zone.

Though three key pads 312, 322, 332 are shown, a single key pad may be used, with the user selecting which portion of the strip 302 is to be activated by selecting the desired credit card company to be used. Thus, for instance, in addition to the standard numeric key pad, the keys V, M and A may be provided, each key activating a corresponding portion of the magnetic strip 302.

Figure 11:
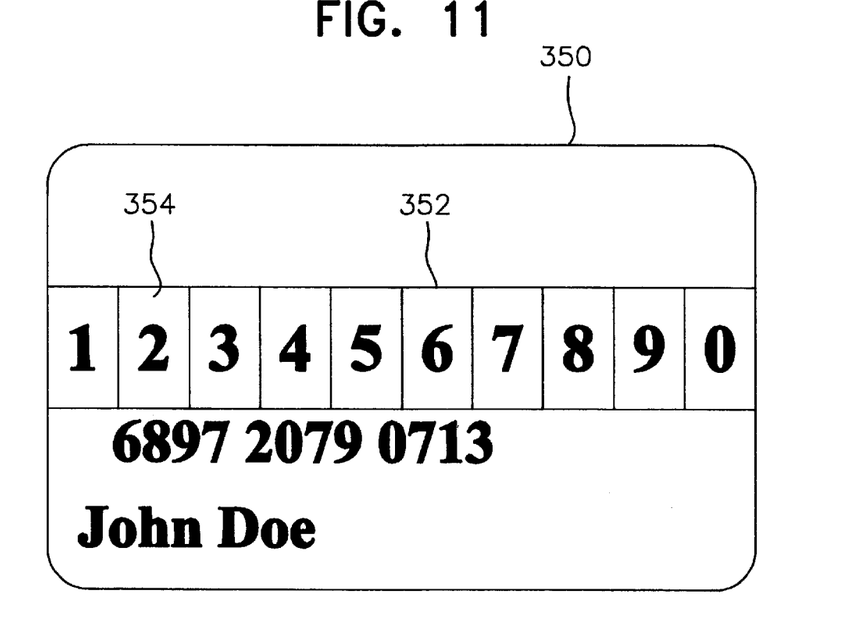
FIGS. 11 and 12 show various authorization cards having key pads.
Figure 12:
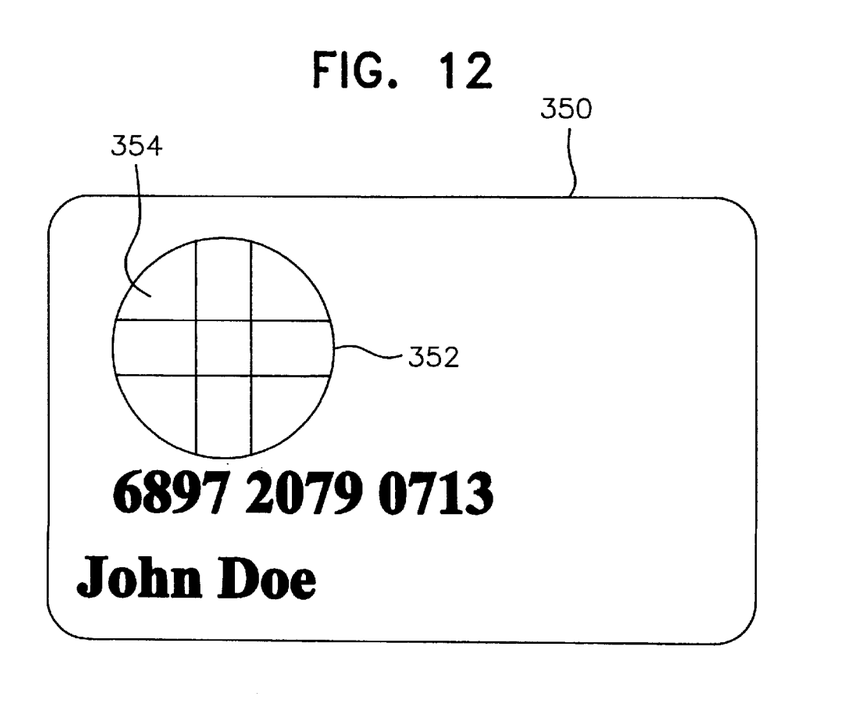

FIGS. 11 and 12 show other arrangements for a key pad 352, for use with an authorization card 350. The front of the authorization card 350 contain the user's name and credit card number, and may also contain other information, such as an expiration date. The keys 354 are large enough to be easily used, preferably about 8–10 mm in width and height.

Each of the preferred embodiments of the invention have the advantage that the physical appearance of the card is not altered once a PIN code is entered. Accordingly, an unauthorized user will not know whether the card is in the disabled state or in an enabled state. Preferably, the cards are configured so that, once the correct PIN code is entered, the card will remain in an enable state for approximately 100–120 seconds. Thus, (except for the smart-card embodiment) if an incorrect PIN code is entered, the user will have to wait until the card resets to the default disable mode before entering a new PIN code.

In addition, each of the preferred embodiments is passive, such that the card automatically returns to a disabled state without requiring that the user perform any function or activity. Thus, there is no chance that the card would remain in an enable state due to an oversight of the user.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. For example, though the invention has been described for use in a credit-card-shaped device, it is recognized that the features may be implemented in devices that store confidential information in a variety of sizes and shapes. Therefore, it is not desired to limit the invention to the specific examples disclosed or the exact construction and operation shown and described. Rather, all suitable modifications and equivalents may be resorted to, falling within the scope of the invention.

We claim:

1. A card for storing confidential information to be accessed by a card reader comprising
   a magnetic strip permanently storing the confidential information on the card,
   means for retaining the magnetic strip in a disable state so that the confidential information permanently stored on the magnetic strip cannot be accessed by the card reader, and
   means for enabling the magnetic strip for a predetermined period of time so that the confidential information permanently stored on the magnetic strip can be accessed by the card reader.

2. The card of claim 1, wherein the card at all times physically appears to be usable.

3. The card of claim 1, wherein the means for enabling further automatically returns the card to the disable state upon expiration of the predetermined period of time.

4. The card of claim 1, wherein the means for enabling comprises a keyboard having keys.

5. The card of claim 1, wherein said means for retaining the magnetic strip in a disable state comprises means for disabling the magnetic strip.

6. The card of claim 1, wherein said means for enabling are internal to said card.

7. The card of claim 1, wherein said means for enabling comprise an identification code.

8. A method for securing confidential information stored on a magnetic strip of a card, the method comprising the steps of retaining the card in a disabled state during which the confidential information stored on the magnetic strip cannot be accessed and enabling a user to place the card in an enabled state for a predetermined period of time during which the confidential information can be accessed from the magnetic strip.

9. The method of claim 8, further comprising the step of automatically returning the card to the disabled state upon expiration of the predetermined period of time.

10. The method of claim 7, wherein the magnetic strip cannot be enabled external from the card.

11. The method of claim 8, wherein the step of enabling comprises entering an identification code.

12. A card for storing confidential information to be accessed by a card reader comprising
    a magnetic strip for permanently storing the confidential information,
    at least one permanent magnet for inducing a magnetic disable field across the magnetic strip for retaining the card in a disable state so that the confidential information stored on the magnetic strip cannot be accessed by the card reader, and
    a keyboard having keys for entering a PIN code, entry of a correct PIN code enabling the magnetic strip for a predetermined period of time so that the confidential information stored on the magnetic strip can be accessed by the card reader.

13. The card as set forth in claim 12, wherein said at least one permanent magnet is placed such that the magnetic strip runs adjacent to said at least one magnet.

14. The card as set forth in claim 13, further comprising:
    a yoke connecting two of said at least one permanent magnet, said yoke being located directly beneath the keys and having gaps filled with a polymer such that, when keys corresponding to the correct PIN code are depressed, the polymer located in the gaps increases in size, increasing a size of respective gaps and decreasing a permeability of the yoke, thereby reducing the magnetic disable field and enabling the magnetic strip.

15. The card as set forth in claim 14, wherein, upon key release, the polymer gradually returns to its original size and the magnetic disable field is reinstated, disabling the magnetic strip.

16. The card as set forth in claim 13, further comprising:
    a yoke connecting two of said at least one permanent magnet; and
    a secondary permanent magnet divided into sections and positioned parallel to and directly beneath said yoke, those sections of said secondary magnet corresponding to correct PIN keys having a reverse-bias such that, when the correct PIN code is entered, the reverse-biased sections move into openings in the yoke to resist magnetic flux in the yoke, thereby reducing the magnetic disable field and enabling the magnetic strip.

17. The card as set forth in claim 16, wherein entry of false keys in addition to the correct PIN code lowers an output signal of the magnetic strip so as to be below a threshold level necessary for enablement.

18. The card as set forth in claim 13, wherein the yoke comprises a plurality of parallel yoke bands.

19. The card as set forth in claim 18, wherein a number of said plurality of parallel yoke bands is equal to a number of digits in said correct PIN code.

20. The card as set forth in claim 12, further comprising:
    a flux closure yoke connecting two of said at least one permanent magnet; and
    a yoke of permeable magnetic material extending from one of the permanent magnets to a point beyond a far side of the magnetic strip, the permeable material at the far side making a turn back toward the permanent magnets to a near side, such that said permeable material passes beneath said magnetic strip, the permeable material at the near side making a turn back toward the far side, such that said permeable material passes beneath said magnetic strip, and said permeable material again making a turn to pass back under said magnetic strip and toward the permanent magnets;
    wherein both of said permanent magnets are on a same side of said magnetic strip and only control a magnetic state of said magnetic strip through passage of magnetic flux through said yoke of permeable magnetic material.

* * * * *